June 24, 1930.  W. F. PFAU  1,767,012
CUT-OFF SAW
Filed Dec. 4, 1926  2 Sheets-Sheet 1

Inventor
WILLIAM F. PFAU,

Patented June 24, 1930

1,767,012

UNITED STATES PATENT OFFICE

WILLIAM F. PFAU, OF CINCINNATI, OHIO, ASSIGNOR TO JOHN T. TOWSLEY MANUFACTURING COMPANY, OF CINCINNATI, OHIO, A CORPORATION OF OHIO

CUT-OFF SAW

Application filed December 4, 1926. Serial No. 152,574.

This invention relates to improvements in circular cut-off saws.

An object of this invention is to provide a cut-off saw that may be mounted on the floor instead of pivotally supported from the ceiling.

Another object of this invention is to provide a cut-off saw that will take the place of swing-saws, having all the advantages of a swing cut-off saw but none of the disadvantages thereof.

Another object of this invention is to provide a self contained, straight line, circular cut-off saw that may be positioned on the floor and which needs no uprights or joists as did the cut-off saws generally used heretofore.

Another object of this invention is to provide a cut-off saw that is compact, comparatively inexpensive to manufacture and install, and economical to operate.

These and other objects are attained by the means described herein and disclosed in the accompanying drawings, in which.

Figure 1:
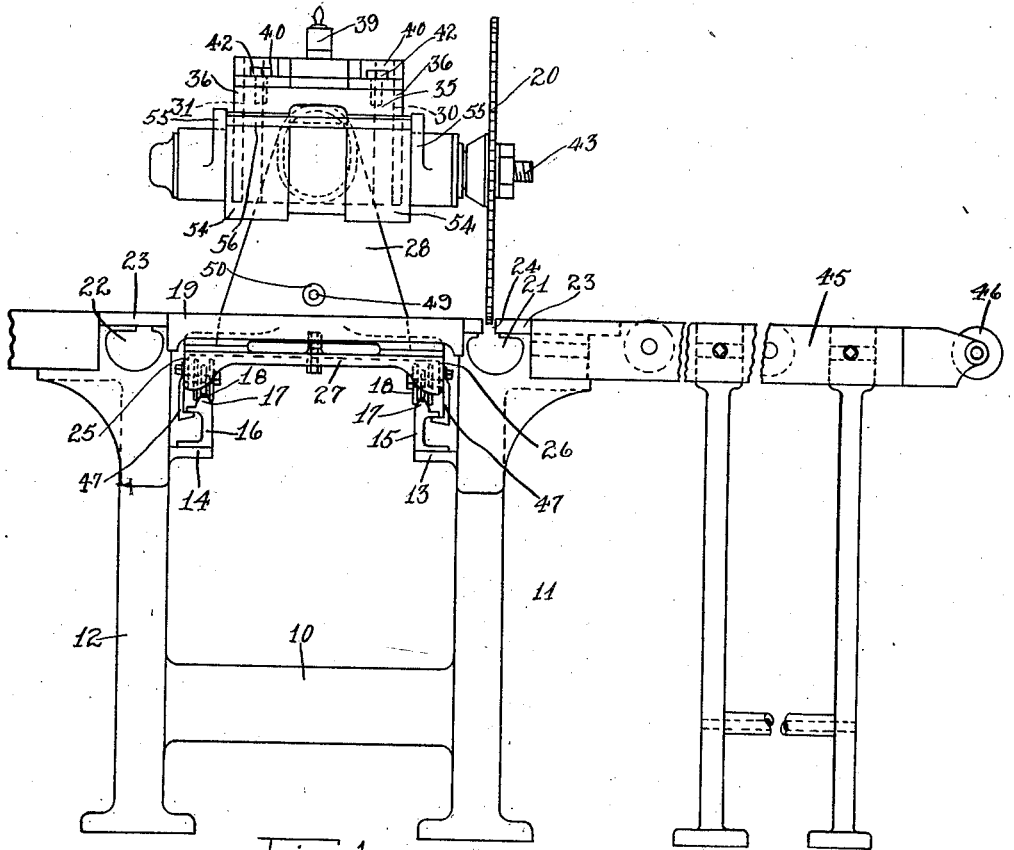
Fig. 1 is a front elevation of the improved cut-off saw.

The improved cut-off saw comprises a frame or bed 10 having spaced supporting legs 11 and 12. The inner surfaces of the legs 11 and 12 are each provided with a shelf, 13 and 14, upon which suitable tracks 15 and 16 are secured. The tracks 15 and 16 terminate in a V shaped bearing surface 17 on which grooved rollers 18 ride. A table 19 is secured to the bed or frame 10 between the supporting legs 11 and 12 upon which the material, lumber, is placed that is to be worked upon by the circular saw 20. This table 19 extends from the forward end of the frame to about the middle thereof and lies above the plane of the carriage 27. The table 19 has pivotally secured to it at 52 an angle iron 48 which serves as an abutment for lumber that is being worked upon by the saw 20. The other end of the abutment 48 is secured to the table by means of a C-clamp 53, however any other suitable securing means may be used in lieu of the clamp 53. It should be noted that the abutment 48 may be secured in any angular position to thereby permit the saw to be used for cutting a bias.

Each of the supporting legs 11 and 12 is provided in its upper end with a pocket or way 21 and 22 in which saw-dust or the like is collected. A cover strip 23 is provided for closing the pocket 22 on the side of the bed which is not being used for the saw blade 20. The cover strip 23 on the opposite side, or that side on which the saw blade 20 is mounted, is provided with a groove 24 communicating with the pocket or way 21 into which groove 24 the circular saw extends.

The rollers 18 are secured to flanges 25 and 26 depending from a carriage 27. The carriage 27 has secured thereto a goose-neck or arm 28 the forward end 29 of which is provided with bearings 30 and 31. A lug 32 extends from the forward end 29 of the goose-neck 28 and lies between the bearings 30 and 31. The lug 32 is provided with a bore 33 through which an adjusting screw 34 extends. A bar or rod 49 is loosely mounted in the arm 28 and extends beyond the front and rear surfaces of the arm 28. The rod 49 is provided with a collar 50 against which one end of a spring 51 abuts. The forward movement of the circular saw is limited by the bar 49 contacting the angle iron or abutment stop 48. The bar 49, collar 50 and spring 51 also serve as a bumper and cushion the contact of the bar with the abutment stop.

A saddle 35 having U shaped arms 36 at its opposite ends receive the bearings 30 and 31 formed on the forward end 29 of the goose-neck 28. The saddle 35 has extending inwardly therefrom a lug 37 in which a threaded perforation 38 is formed for receiving the adjusting screw 34. The adjusting screw 34 is provided on its upper end with a handle or lever 39 by means of which the screw is rotated for reciprocating the saddle 35 vertically along the bearings 30 and 31. Any suitable means, such as bolts 520 may be provided for securing the saddle 35 in its adjusted position. The saddle 35 is also provided with arms 40 to which a motor 41 is secured by any suitable means, such as bolts 42. The motor frame 54 has arms 55 extending therefrom which receive a handle bar 56. The handle bar 56 is employed to actuate the motor 41 and carriage 27 longitudinally of the bed.

Figure 3:
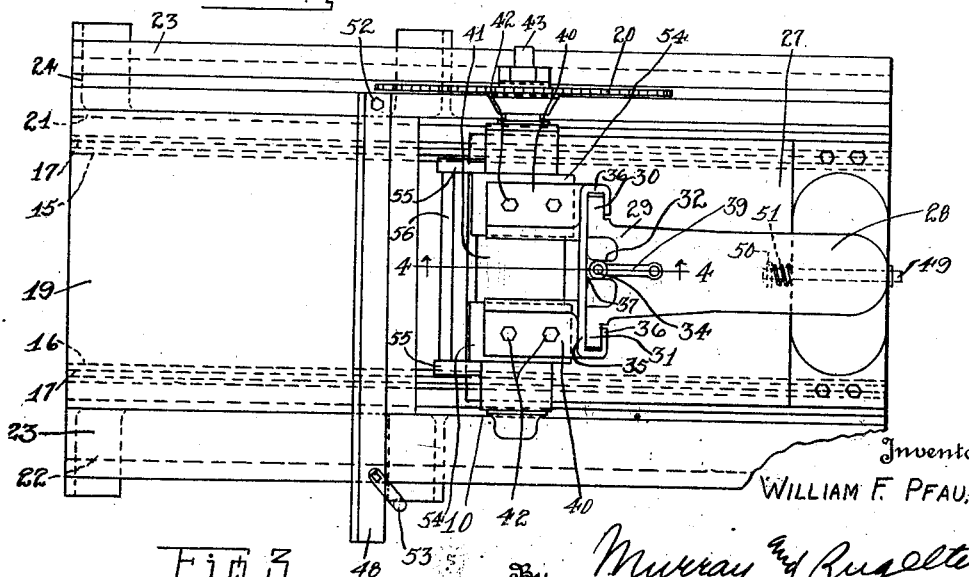
Fig. 3 is a top plan view of the saw shown in Fig. 2.
Figure 2:
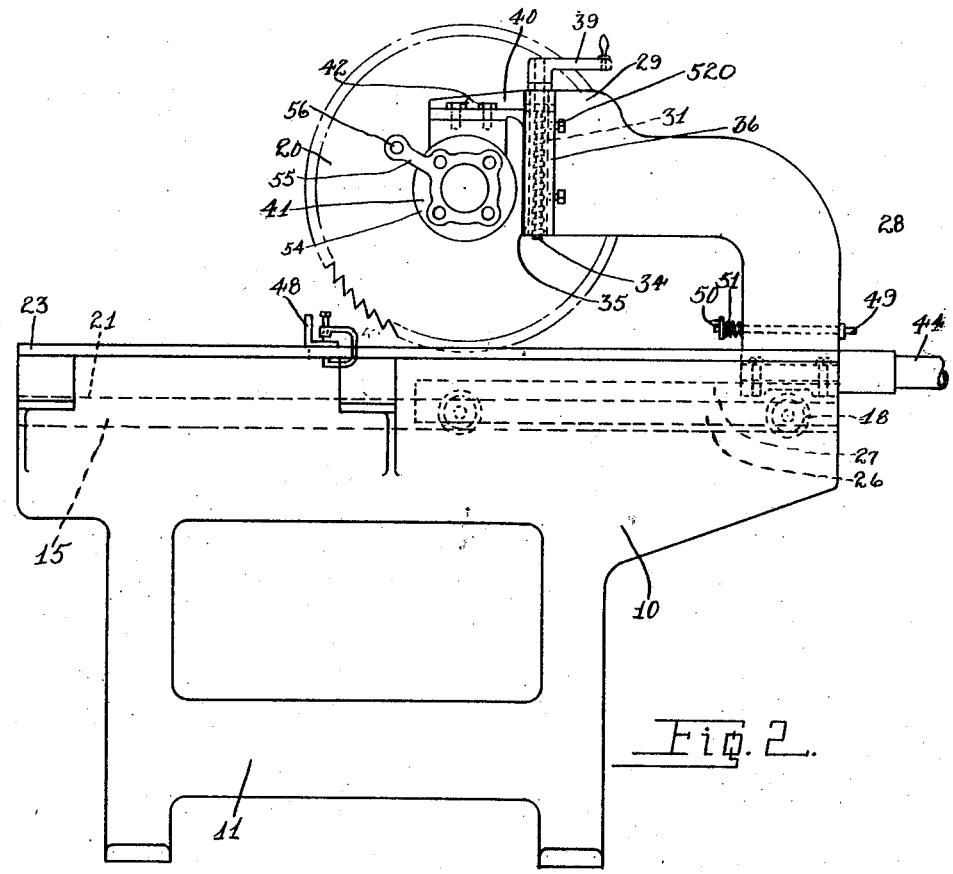
Fig. 2 is a side elevation of the cut-off saw, showing the circular saw mounted on the other end of the motor shaft from that shown in Fig. 1.
Figure 4:
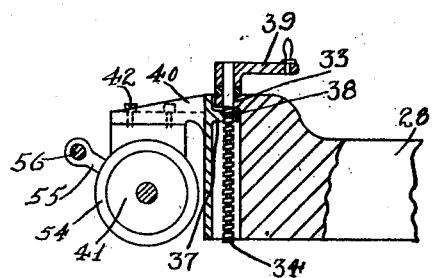
Fig. 4 is a sectional view taken on line 4—4 of Fig. 3.

The shaft 43 of the motor 41 carries the saw blade 20; as shown in Fig. 1 the blade 20 is mounted on the right hand side. It should be noted however that the motor shaft may be extended on the left hand side of the motor and the blade secured thereon, as shown in Figs. 2 and 3.

The reversal of saw position may be obviously accomplished by bodily reversing the motor 41 and saddle 45 on bearings 30 and 31 and then changing the electrical connection for the motor.

Suitable blowers or exhaust fans may be employed to draw off saw-dust and the like that is collected in the pockets or ways 21. The blowers are connected to the saw by means of pipes 44 which are secured to the rear of the bed 10. Any form of extension table 45 with or without rollers 46 may be secured to the side of the bed 10 as shown in Fig. 1, upon which the lumber to be worked on may be placed.

It should be noted that the carriage 27 carrying the saw and motor 20 and 41 is supported at its opposite ends by the rollers 18 and is freely movable longitudinally of the bed. Suitable hook shaped retaining members 47 having one end secured to the flanges 25 and 26 are provided to retain the rollers 18 upon the tracks 17.

What is claimed is:

1. In a device of the class described the combination of a bed having opposed supporting legs, a track on each of the opposed faces of the supporting legs, a work supporting table carried by the bed and disposed above the tracks, a carriage, means secured to the carriage contacting the tracks and supporting the carriage on the tracks whereby it may be reciprocated longitudinally of the bed and in a plane beneath the work table, a goose-neck secured to the carriage, and a self contained motor driven tool carried by the end of the goose-neck adapted to be actuated in a plane above the work table so that the tool may operate on the material on said work table.

2. In a device of the class described the combination of opposed supporting leg members having ways in the tops thereof, opposed tracks supported on adjacent sides of said leg members, a fixed table extending between the ways on the tops of the legs, a carriage reciprocable on the tracks beneath the table and having an overhanging portion movable therewith above the plane of the table, a motor mounted on said overhanging portion and a saw directly connected to one end of the motor for selective operation in the ways in the leg members.

3. In a device of the class described the combination of opposed leg members having ways in the top thereof, a fixed work table connecting the leg members adjacent one end, tracks on adjacent faces of the leg members, a carriage reciprocable on the tracks, an overhanging portion on the carriage for movement above the table upon reciprocation of the carriage, a motor having a shaft extended from one end thereof and mounted for vertical adjustment on the overhanging portion of the carriage, a tool mounted on the motor shaft and adapted to travel through the way in one of the leg members and a closing means for the way in the other of said leg members.

In testimony whereof, I have hereunto subscribed my name this 30th day of November, 1926.

WILLIAM F. PFAU.